Dec. 5, 1939.  F. BRUGGIMANN  2,182,656
MACHINE FOR MOLDING AND DIVIDING PLASTIC MATERIAL
Filed Feb. 12, 1937
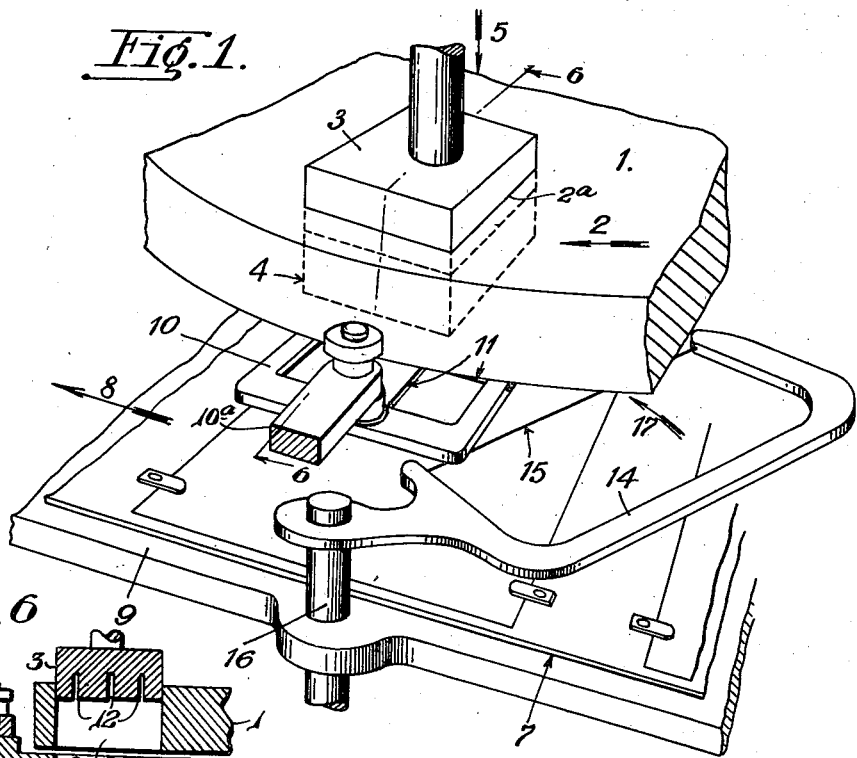
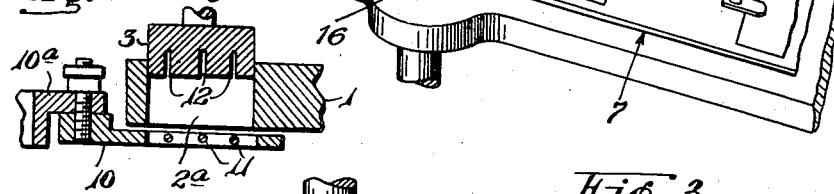
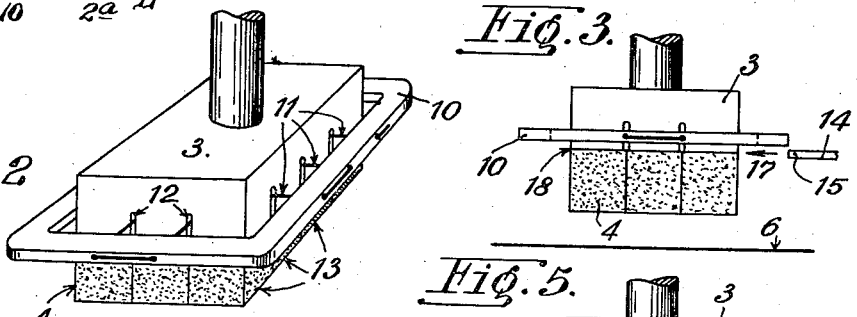
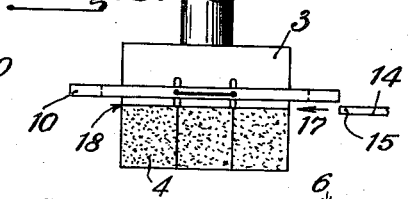
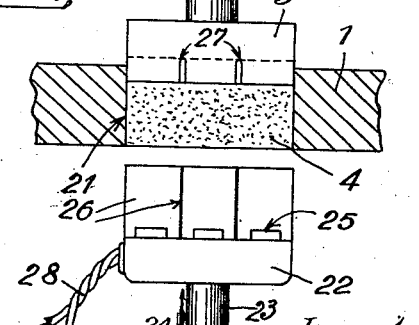
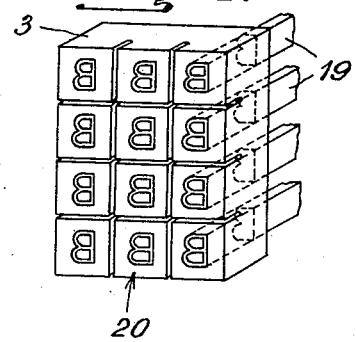
Inventor
Fernand Bruggimann
By Munn, Anderson & Liddy
Attorneys Patented Dec. 5, 1939

2,182,656

UNITED STATES PATENT OFFICE 2,182,656

MACHINE FOR MOLDING AND DIVIDING PLASTIC MATERIAL

Fernand Bruggimann, Geneva, Switzerland

Application February 12, 1937, Serial No. 125,418

5 Claims. (Cl. 31—24)

The present invention refers to a machine for molding and dividing a pasty mass such as, for example, butter. It refers particularly to such a machine in which cakes of pasty mass are molded in a cell. The top of this cell is constituted by a piston serving to the expulsion of the molded cake, means being besides provided in order that the molded cake may be of weight and size very exactly determined.

According to the invention the molded cake is divided in portions by means of devices cutting said cake according to planes perpendicular to the surface of the piston to which the cut portions remain adherent until the moment when the piston being found above a packing sheet, a separating organ passing in the plane of the surface of the piston detaches the divided cake which is then submitted in its whole to a packing operation including all portions at the same time.

The molded cake can be divided in the cell in which it is molded, as in Fig. 5, or it can be divided outside of the cell after expulsion as in Fig. 3. Finally, it is possible to impress signs on the cake in such a manner for instance that the same sign be repeated on each portion; the printing can take place independently of the dividing as in Fig. 4 or simultaneously with the latter operation as in Fig. 5.

The annexed drawings show as an example an embodiment of the machine according to the invention; Fig. 1 is a diagrammatic perspective view illustrating the structure and principle of the invention; Fig. 2 is a view in perspective of the piston and of the molded cake after expulsion and at the very moment of the dividing operation; Fig. 3 is an end elevation illustrating the separating act; Fig. 4 is a perspective view of a modification of the piston wherein the working face is fitted with impressing means; Fig. 5 is a section of a part of a modified machine in which the dividing of the cake takes place in the cell at the same time as the imprinting; Figure 6 is a vertical section taken on the line 6—6 of Fig. 1.

The portion of the machine diagrammatically shown by Fig. 1 comprises a plate 1 rotating in the direction of arrow 2 and carried several cells 2a (Fig. 6). In each of these cells is partially engaged the piston 3 by which a cake of butter 4 is molded, due to the butter being forced in as presently explained. To expel the cake the piston is lowered in the direction of arrow 5. The cake falls then on a sheet of packing paper 6 placed on a belt 7 or equivalent conveyor moving in the direction of arrow 8 on a table 9. Before reaching the paper the cake 4 is driven through a fixed frame 10 in which wires are drawn for the purpose of dividing the cake in portions all exactly of the same size and consequently of the same weight. The frame 10 may be fixed in any appropriate way, for example by attachment to a support 10a, (Figs. 1 and 6).

Fig. 2 shows the piston 3 lowered in expelling position. The cake 4 is then completely found under frame 10, as best shown in Fig. 3, this being rendered possible by the fact the wires 11 of the latter can penetrate in corresponding grooves 12 of the piston. The cake is then divided in portions 13 which however are not cut off the one from the other, not only because of a light adherence between the cut portions but chiefly by the fact that these portions are adherent to piston 3 from which they must then be separated.

This separation is effected in the manner shown in Figs. 1 and 3. The machine comprises to that effect a bow 14 with a drawn wire 15, this bow being capable of turning around a shaft 16 in order to be moved in the direction of arrow 17. As shown in Fig. 3 the wire 15 of the bow passes then in the plane of adhesion 18 from the divided cake to the piston, that is to say, it follows exactly the lower surface of said piston. The divided cake drops then on a sheet of paper 6 to be submitted then in its whole to a packing operation including all portions at the same time.

As these portions are incapable of adhering back to back, it is therefore easy to separate them as soon as the cake packed in that way is unpacked.

Instead of providing only one fixed frame with wires drawn, one could also place such a frame under each cell in fixed relationship to the rotating plate.

If it is wished to impress a sign or a letter, the letter B for instance, the initial of the word "butter", on each portion it is sufficient for instance, to place the piston in the manner shown in Fig. 4. This piston is bored through by apertures in which slide bars such as 19, each of them bearing at its extremity the letter B.

Normally these bars reach beyond the lower surface 20 of the piston in such a manner that the letters B are slightly in relief and impress consequently in hollow in the portions of butter. At the moment of extracting, when the piston is lowered, the bars are receding in order not to obstruct the passing of the wire 15 of the bow 14.

It is of course simpler to proceed with the printing on the lower surface of the molded cake, it can be done at any time during the molding operation.

A special construction illustrated by Fig. 5 shows how one can proceed with a printing simultaneously with the dividing operation of the cake.

In this figure is seen plate 1 with a cell 21 in which is partially engaged the piston 3, the resting part of the cell being filled with a cake of butter 4 of exact weight and dimension. In the position of cell 21 preceding the extracting position, the cell is moved to a place above a punch 22 which a shaft 23 can lift in the direction of arrow 24. This punch bears engraved signs destined to be printed in the portions which will be cut at the same time by very thin cutters 26. The piston 3 is equally provided with grooves 27 allowing these cutters to penetrate lightly in the latter in order to obtain a perfect division of the mass.

The following inconvenience might occur: in receding the punch 22 might draw a portion of the mass retained confined between the cutters 26. This inconvenience can however be done away with very easily in heating the punch and the cutters at a temperature which will be slightly higher than the temperature of the other parts of the machine. To that effect the punch shown here is containing an electric heating unit fed with current through the wire 28. The cutters 26 being slightly warm slide then very easily in the butter without adhering to it.

What I claim is:

1. A machine of the character described comprising a plate having a cell adapted to contain a pasty material, a piston forming one end of the cell and being movable outwardly of said cell, a stationary frame having cutting wires located at the exit of the cell and being adapted to have said pasty material impressed therethrough as said material is expelled from the cell by said movement of the piston, the resulting cut portions adhering to the bottom of the piston, and a separating organ operable in the plane of the bottom of the piston and below said frame to detach said material.

2. A machine of the character described, comprising a plate having an upright cell adapted to contain a pasty material, paper conveyor means below and spaced from the plate, a piston forming the top of the cell and being movable downwardly therein to expel the pasty material toward a sheet of paper on the conveyor means, means at the exit of the cell for cutting the pasty material as said piston moves to a position of advance of its working face beyond the cutting means, and means operating in the plane of the advanced working face for separating the cut material from the piston so that said cut material may stand upon the paper.

3. A machine of the character described comprising a plate having a cell adapted to contain a pasty material, movable paper conveyor means below and spaced from the plate, and a piston forming the top of the cell being movable therein to periodically expel successive batches of pasty material onto successive sheets of paper carried by said conveyor.

4. A machine of the character described comprising a plate having a cell of a depth equal to the thickness of the resultant components of a pasty material which the cell is adapted to contain, a piston forming one end of the cell and movable in a single stroke to expel the entire cake of pasty material, means for cutting said cake during such expulsion of said material from the cell by said single stroke of the piston, to the working face of which piston the aforesaid components remain adherent, and a separating organ operable in the plane of the working face of the piston to detach said components.

5. A machine of the character described comprising a plate having a cell adapted to contain a pasty material, means for cutting said pasty material comprising elements stationarily situated at the exit of the cell, a piston forming one end of the cell and being movable outwardly thereof to a position of advance of its working face beyond said cutting means, said piston having grooves in said working face, said grooves being penetrated by said elements when said working face crosses the zone of said elements, and a separating organ operable in the plane of the advanced working face to detach the cut material adhering thereto.

F. BRUGGIMANN.